March 25, 1930.　　D. C. PRINCE　　1,752,109
ELECTRICAL SYSTEM
Filed Feb. 11, 1926　　2 Sheets-Sheet 1

Inventor:
David C. Prince,
by [signature]
His Attorney.

Inventor:
David C. Prince,
by  *[signature]*
His Attorney.

Patented Mar. 25, 1930

1,752,109

UNITED STATES PATENT OFFICE

DAVID C. PRINCE, OF SCHENECTADY, NEW YORK, ASSIGNOR TO GENERAL ELECTRIC COMPANY, A CORPORATION OF NEW YORK

ELECTRICAL SYSTEM

Application filed February 11, 1926. Serial No. 87,688.

My invention relates to systems wherein an electrical current transmitted between direct and alternating current circuits is rectified or derectified by a valve apparatus, and has for its principal object the provision of an improved means for regulating the voltage of the circuit to which current is supplied.

It is well known that, in the operation of a rectifying or derectifying apparatus comprising a plurality of anodes, current is successively carried by each of the anodes during a period of time dependent on the number of phases and the frequency of the alternating current delivered or received by the apparatus; that the period of current transmission through each anode of the apparatus may be lengthened by interposing an interphase transformer in the circuit interconnecting the direct and alternating current circuits; and that lengthening the time of current transmission through each anode of the apparatus decreases the average value of the direct current voltage where the apparatus is supplied with current from a constant potential source of alternating current and produces a corresponding change in the relation between the direct and alternating voltages where current is supplied to the apparatus from a direct current source of constant potential.

As pointed out in my copending applications for Letters Patent of the United States, Serial No. 739,443, filed September 23, 1924, and Serial No. 49,827, filed August 12, 1925, the effect of the interphase transformer may be nullified by saturating its core and the change in the relation between the alternating and direct current voltages thus produced may be utilized to regulate the voltage of the circuit to which current is supplied.

My present invention is similar in some respects to those disclosed by the aforesaid applications but differs therefrom in that the period of current transmission is lengthened by means of a main transformer provided with windings connected in Y and in star and in that the third harmonic of the fundamental voltage applied to the Y-connected winding is varied in magnitude for the purpose of regulating the voltage transformation ratio of the transformer.

My invention will be better understood from the following description when considered in connection with the accompanying drawings and its scope will be pointed out in the appended claims.

Figure 1:
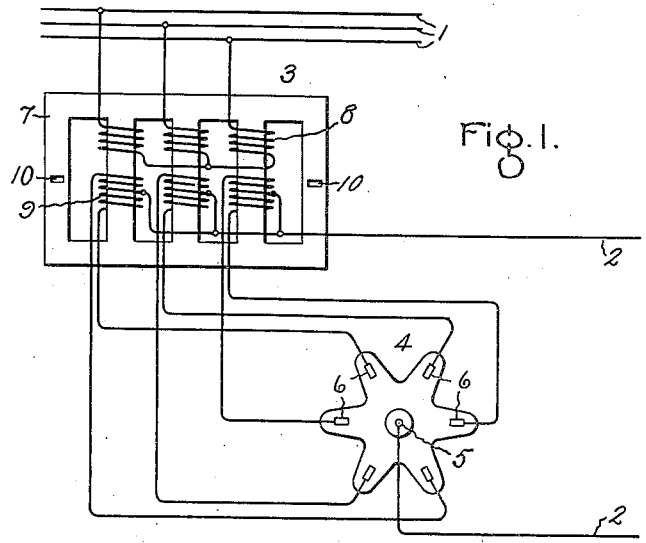
Figure 2:
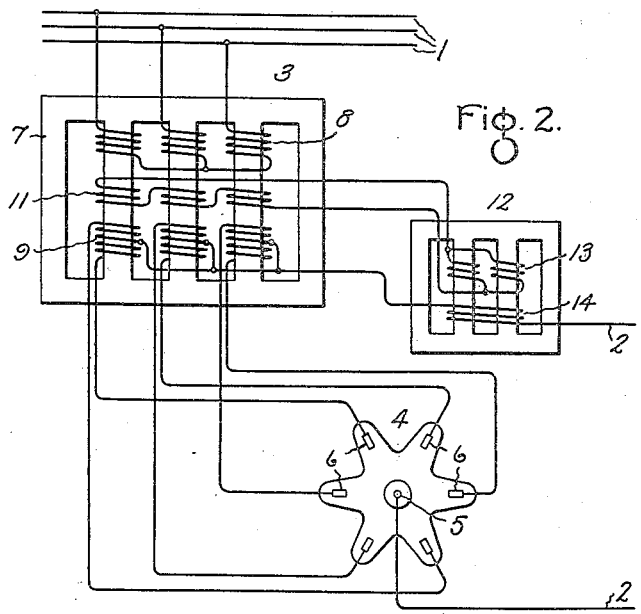
Figure 3:
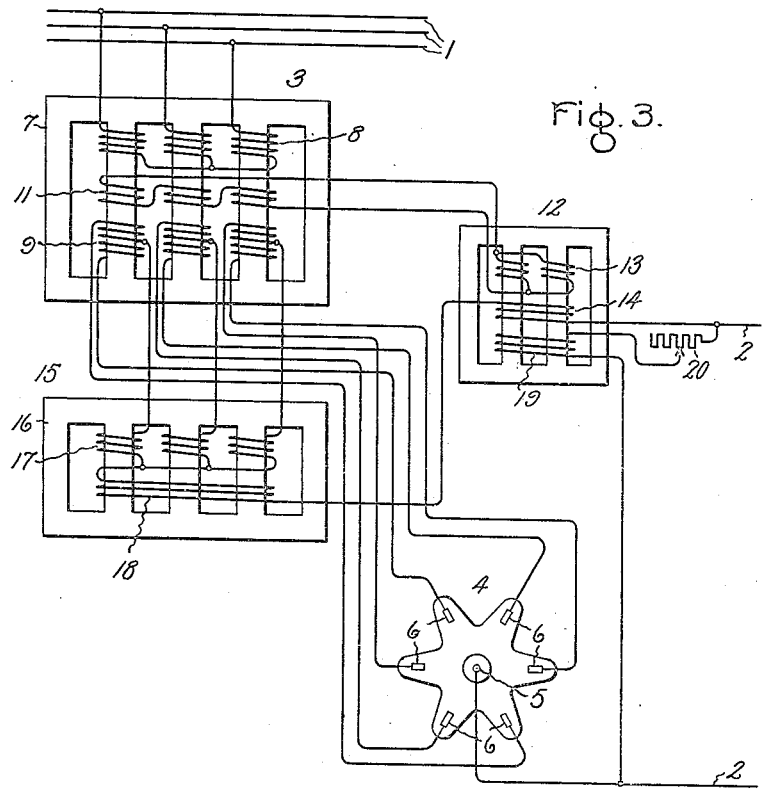

Referring to the drawings, Figs. 1 and 2 show systems comprising different means for controlling the third harmonic of the fundamental voltage applied to the main transformer; and Fig. 3 shows a system wherein an interphase transformer and a saturated core reactor are utilized together for the purpose of regulating the relation between the voltages of the direct and alternating current circuits.

Fig. 1 shows a system wherein an alternating current circuit 1 is interconnected with a direct current circuit 2 through a transformer 3 and a valve apparatus 4 comprising a cathode 5 and anodes 6. The transformer 3 is provided with a core 7 upon which are wound a Y-connected winding 8 and a star-connected winding 9. Slots 10 are made in the outer legs of the core 7 for the purpose of limiting the magnitude of the third harmonic of the fundamental voltage applied to the winding 8. It will be observed that one conductor of the direct current circuit 2 is connected to the neutral of the star-connected winding 9 and that the terminals of this winding are connected to the anodes 6 of the valve apparatus.

With these connections the outer legs of the transformer core become saturated when the third harmonic of the fundamental voltage has attained a predetermined magnitude and further increase in the voltage of the harmonic and its multiple is prevented for the reason that no complete magnetic circuit is provided for the harmonic fluxes that would otherwise be produced. Undue increase in the magnitude of the voltage produced by the third harmonic and its multiples obviously could be prevented by the use of a core having three legs. Such a core structure is undesirable however for the reason that satisfactory operation of the rectifier with the Y-star connection of the transformer requires a third harmonic voltage which is about 21 per cent of the fundamental voltage. Various means other than the slots 10 may be utilized to maintain the third harmonic voltage within predetermined limits.

Fig. 2 shows an arrangement wherein the third harmonic voltage is regulated by means of a tertiary winding 11 wound on the core 7 and connected in open-delta to a saturated core regulator which comprises a winding 13 connected in circuit with the open-delta winding 11 and a winding 14 connected in the direct current circuit 2 for varying the magnitude of the third harmonic voltage and the voltage transformation ratio of the transformer 7 in response to change in the current of the direct current circuit.

With these connections, the impedance of the regulator 12 is high when the current of the circuit 2 is small, the magnitude of the third harmonic voltage is high and the voltage transformation ratio of the main transformer 3 is maintained at a comparatively low value. As the current of the circuit 2 increases, however, the core of the regulator 12 becomes more highly saturated, the magnitude of the voltages of the third harmonic and its multiples is decreased, and the voltage transformation ratio of the main transformer 3 is correspondingly raised thus tending to compensate for the drop in direct current voltage occasioned by increase in the load of the circuit. The range over which the direct current voltage is regulated may be materially extended by connecting an interphase transformer to the direct current circuit in series with the saturation regulator 12.

Fig. 3 shows an interphase transformer 15 comprising a core 16 upon which are wound a winding 17 connected in the neutral leads of the main transformer winding 9 and a winding 18 connected to the direct current circuit in series with the saturation winding 14 of the saturated core regulator 12. In the arrangement of Fig. 3, the regulator 12 is also provided with a differential winding 19 which is connected to the direct current circuit 2 through an adjustable control device shown as a resistor 20.

When the current of the direct current circuit 2 is small, the core of the interphase transformer 15 is unsaturated, the core of the regulator 12 is saturated due to the current of the differential winding 19, and a voltage corresponding to .9 times the root mean square voltage is applied to the direct current circuit. As the current of the direct current circuit increases, the core of the interphase transformer becomes saturated, the core of the regulator 12 becomes desaturated, and the voltage of the direct current circuit is gradually raised to a value corresponding to 1.17 times the root mean square voltage. Upon further increase in the current of the direct current circuit, the saturation of the regulator core is increased and the voltage of the direct current circuit is gradually raised to a value corresponding to 1.35 times the root mean square voltage. The voltage of the direct current circuit is thus varied gradually in response to change in the current of the direct current circuit and is at all times dependent on the magnitude of this current.

It will be readily understood that the mercury rectifier may be provided with the usual starting electrode and smoothing reactor if desired.

The embodiments of the invention illustrated and described herein have been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States, is,—

1. The combination of direct and alternating current circuits, a transformer comprising star-connected and Y-connected windings wound on the same core, a valve apparatus comprising a cathode and an anode connected between said circuits through said transformer, and means responsive to the third harmonic of the fundamental voltage applied to said transformer for regulating the transformation ratio of said transformer.

2. The combination of direct and alternating current circuits, a transformer comprising a Y-connected winding connected to said alternating current circuit and a star-connected winding wound on the same core as said Y-connected winding, a valve apparatus comprising a cathode connected to said direct current circuit and an anode connected to said star-connected winding, and means associated with said core for varying the magnitude of the third harmonic of the fundamental voltage applied to said Y-connected winding by said alternating current circuit.

3. The combination of direct and alternating current circuits, a transformer comprising star-connected and Y-connected windings wound on the same core, a valve apparatus comprising a cathode and an anode connected between said circuits through said transformer, and means including a winding connected in open-delta and wound on said core for maintaining within predetermined limits the third harmonic of the fundamental voltage applied to said transformer by one of said circuits.

4. The combination of direct and alternating current circuits, a transformer comprising star-connected and Y-connected windings wound on the same core, a valve apparatus comprising a cathode and an anode connected between said circuits through said transformer, a winding connected in open-delta and wound on said core, and a saturation reactor connected between said open-delta winding and said direct current circuit for regulating the voltage of one of said circuits by variation in the magnitude of the third harmonic of the fundamental voltage applied to said transformer through the other of said circuits.

5. The combination of direct and alternating current circuits, a transformer comprising star-connected and Y-connected windings wound on the same core, a valve apparatus comprising a cathode and an anode connected between said circuits through said transformer, a winding connected in open-delta and wound on said core, and a saturation regulator comprising a winding connected to said open-delta winding and a winding connected to said direct current circuit whereby the voltage transformation ratio of said transformer is varied in response to change in the current of said direct current circuit.

6. The combination of a direct current circuit, a transformer comprising windings connected in Y, star and open-delta, a valve apparatus comprising an anode connected to a terminal of said star-connected winding and a cathode connected to said direct current circuit, an interphase transformer connected in the neutral connections of said star-connected winding, and a saturation regulator comprising a winding connected between said interphase transformer and said direct current circuit and a winding connected to said open-delta winding.

7. The combination of a direct current circuit, a transformer comprising windings connected in Y, star and open-delta, a valve apparatus comprising an anode connected to a terminal of said star-connected winding and a cathode connected to said direct current circuit, an interphase transformer connected in the neutral connections of said star connected winding, and a saturation regulator provided with a winding connected to said direct current circuit in series with said interphase transformer, with a winding connected to said open-delta winding and with a winding connected to said direct current circuit.

8. The method of regulating the voltage of a direct current circuit connected to an alternating current circuit through means comprising an interphase transformer and a saturation regulator which comprises successively saturating the cores of said transformer and said regulator.

9. The method of regulating the voltage of a direct current circuit connected to an alternating current circuit through means comprising a valve apparatus, which comprises varying the voltage produced by the third harmonic of the fundamental voltage of said alternating circuit in response to change in the current of said direct current circuit.

In witness whereof, I have hereunto set my hand this 10th day of February, 1926.

DAVID C. PRINCE.